US012699860B1

(12) United States Patent
Lau et al.

(10) Patent No.: US 12,699,860 B1
(45) Date of Patent: Aug. 4, 2026

(54) SYSTEM AND METHOD FOR USING QR CODES PRINTED BY A MOBILE PRINTING ROBOT IN A CONSTRUCTION SITE

(71) Applicant: Dusty Robotics, Inc., Mountain View, CA (US)

(72) Inventors: Tessa Ann Lau, Sunnyvale, CA (US); Philipp Josef Herget, Sunnyvale, CA (US)

(73) Assignee: Dusty Robotics, Inc., Mountain View, CA (US)

( * ) Notice: Subject to any disclaimer, the term of this patent is extended or adjusted under 35 U.S.C. 154(b) by 0 days.

(21) Appl. No.: 18/740,963

(22) Filed: Jun. 12, 2024

Related U.S. Application Data

(60) Provisional application No. 63/507,700, filed on Jun. 12, 2023.

(51) Int. Cl.
  *G06K 7/14* (2006.01)
  *G06K 1/12* (2006.01)
(52) U.S. Cl.
  CPC ........... *G06K 7/1417* (2013.01); *G06K 1/121* (2013.01)
(58) Field of Classification Search
  CPC ....... G06K 7/1417; G06K 1/121; G06Q 50/08
  See application file for complete search history.

(56) References Cited

U.S. PATENT DOCUMENTS

| | | | | |
|---|---|---|---|---|
| 5,755,072 A | * | 5/1998 | Lingafelter | E04G 21/18 52/741.1 |
| 9,424,545 B1 | * | 8/2016 | Lee | G06Q 10/063114 |
| 2007/0027732 A1 | * | 2/2007 | Hudgens | G06Q 10/0631 705/7.17 |
| 2008/0061145 A1 | * | 3/2008 | McGushion | G06Q 10/08 29/407.04 |
| 2014/0095119 A1 | * | 4/2014 | Lee | G06T 19/00 703/1 |
| 2016/0050202 A1 | * | 2/2016 | Swallow | G06F 21/34 726/9 |
| 2016/0224927 A1 | * | 8/2016 | Pettersson | G06Q 10/067 |
| 2017/0278030 A1 | * | 9/2017 | Pettersson | G06Q 50/08 |
| 2019/0138667 A1 | * | 5/2019 | Benesh | G06Q 50/08 |

* cited by examiner

*Primary Examiner* — Laura A Gudorf
(74) *Attorney, Agent, or Firm* — Patent Law Works, LLP

(57) ABSTRACT

A system and method for providing construction management services utilizes a mobile robotic printer to print location information tags when a layout is printed. The location information tags can be later scanned and used to identify a location of a user on a construction site when the user scans the location information tag with a mobile computing device, such as a smartphone or a tablet device. The user's credential may also be used to identify the user's ID and their role in the construction project. A variety of services may be provided, including providing role-based construction information.

21 Claims, 9 Drawing Sheets

CAD layout files

Tag Default Positions, Numbers, and Location Coding Format

160

Mobile Printing Robot 150

Layout Printing Combined With Scannable Printed Location Tags (e.g., QR Code) Printing At Selected Locations

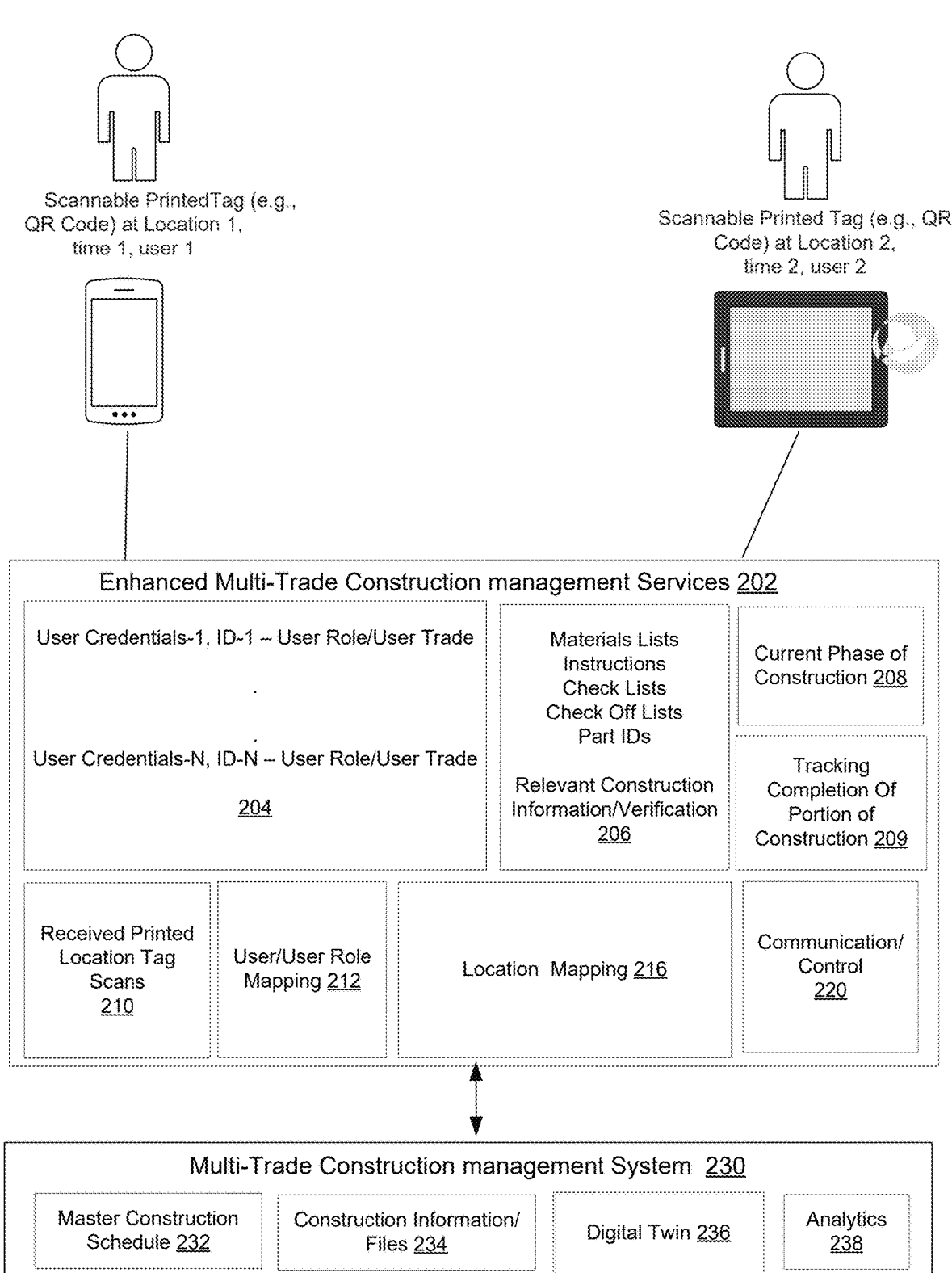

Scannable PrintedTag (e.g., QR Code) at Location 1, time 1, user 1

Scannable Printed Tag (e.g., QR Code) at Location 2, time 2, user 2

Enhanced Multi-Trade Construction management Services 202

User Credentials-1, ID-1 -- User Role/User Trade

.

.

.

User Credentials-N, ID-N -- User Role/User Trade

204

Materials Lists
Instructions
Check Lists
Check Off Lists
Part IDs

Relevant Construction Information/Verification
206

Current Phase of Construction 208

Tracking Completion Of Portion of Construction 209

Received Printed Location Tag Scans
210

User/User Role Mapping 212

Location Mapping 216

Communication/ Control
220

Multi-Trade Construction management System 230

Master Construction Schedule 232

Construction Information/ Files 234

Digital Twin 236

Analytics 238

Fig. 2

Select Default Numbers And Layout Positions of QR Codes To Be Printed
300

Receive Layout Files 302

Modify Layout To Add QR Codes  At Specific Layout Locations (e.g., one per room) 304

Print Layout By Mobile Printing Robot With QR Codes at Specified Locations 306

Report printing and final QR Code Locations 308

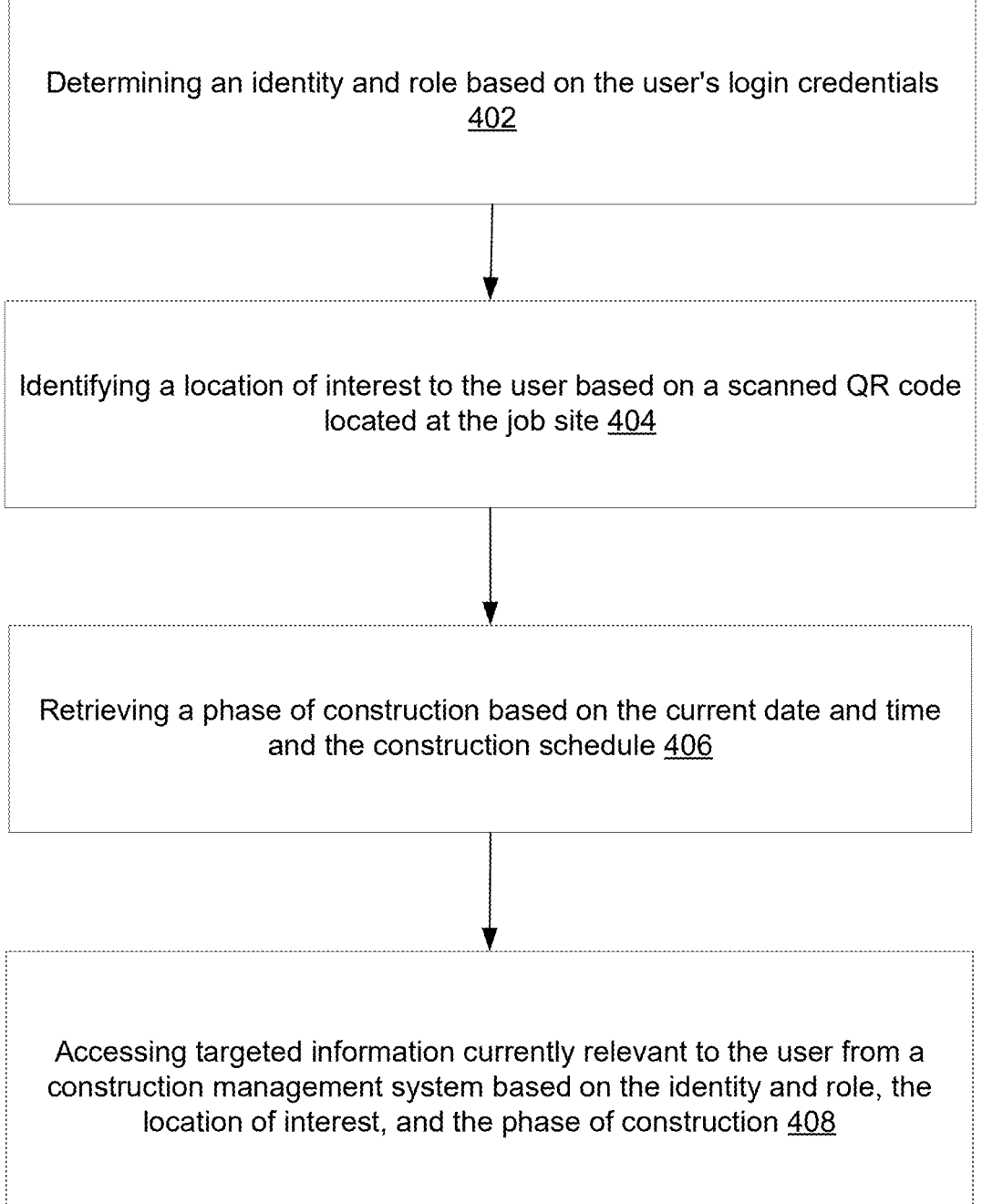

Determining an identity and role based on the user's login credentials
402

Identifying a location of interest to the user based on a scanned QR code located at the job site 404

Retrieving a phase of construction based on the current date and time and the construction schedule 406

Accessing targeted information currently relevant to the user from a construction management system based on the identity and role, the location of interest, and the phase of construction 408

Fig. 4

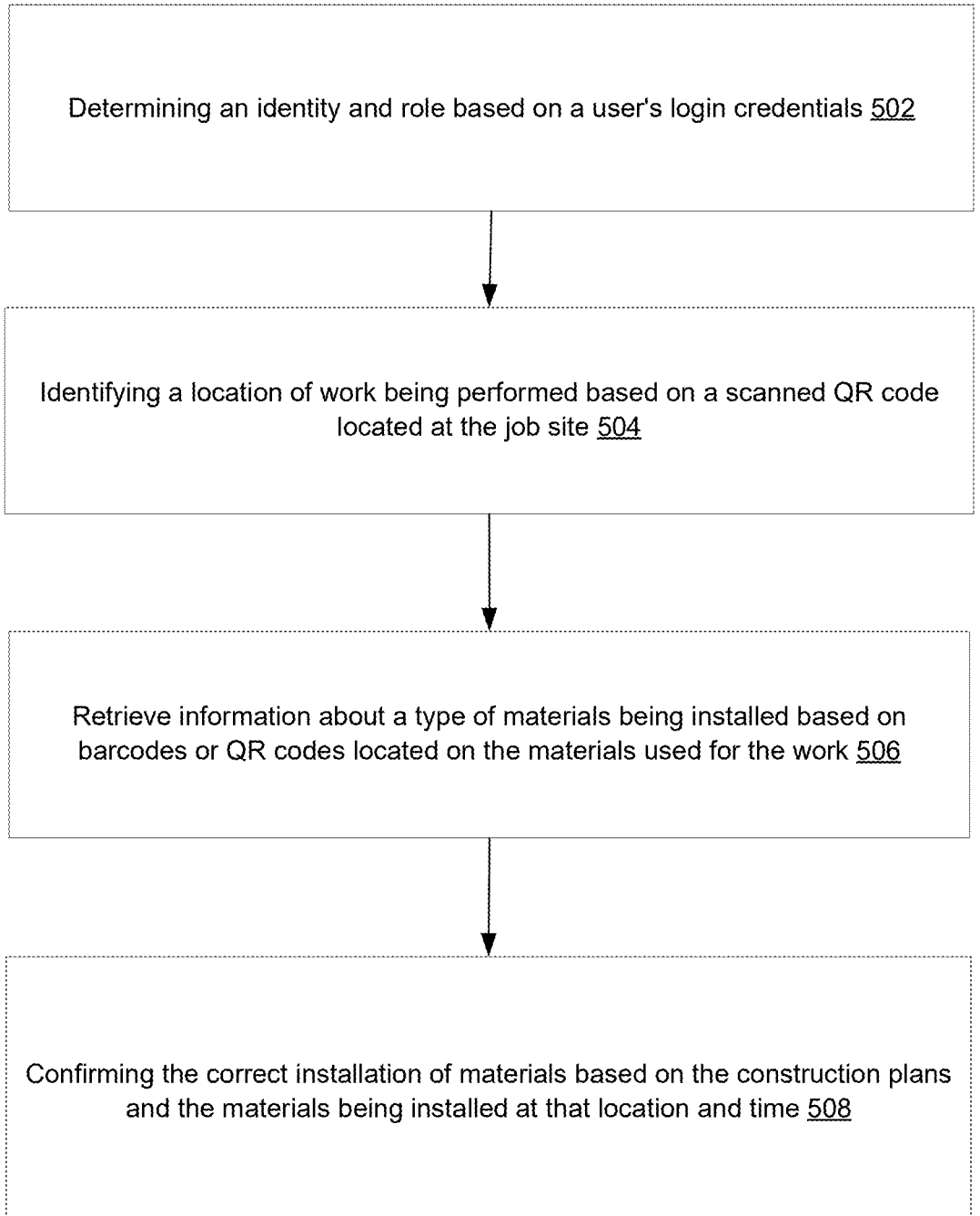

Determining an identity and role based on a user's login credentials 502

Identifying a location of work being performed based on a scanned QR code located at the job site 504

Retrieve information about a type of materials being installed based on barcodes or QR codes located on the materials used for the work 506

Confirming the correct installation of materials based on the construction plans and the materials being installed at that location and time 508

Fig. 5

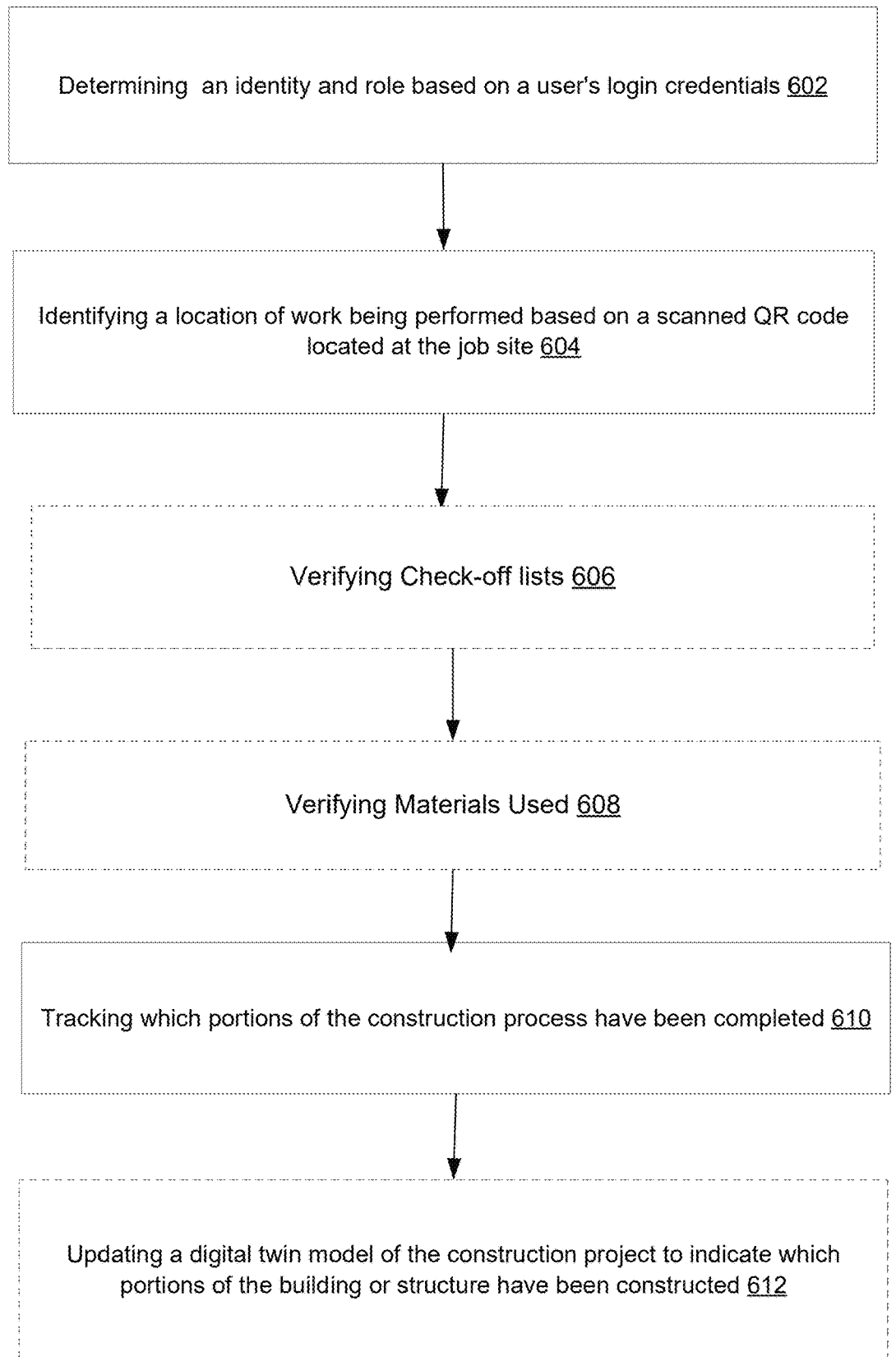

Determining an identity and role based on a user's login credentials 602

Identifying a location of work being performed based on a scanned QR code located at the job site 604

Verifying Check-off lists 606

Verifying Materials Used 608

Tracking which portions of the construction process have been completed 610

Updating a digital twin model of the construction project to indicate which portions of the building or structure have been constructed 612

Fig. 6

SYSTEM AND METHOD FOR USING QR CODES PRINTED BY A MOBILE PRINTING ROBOT IN A CONSTRUCTION SITE

CROSS REFERENCE TO RELATED APPLICATION

This application claims the benefit of U.S. provisional application No. 63/507,700, filed on Jun. 12, 2023.

FIELD OF THE INVENTION

The present disclosure generally relates to improvements in construction management using location information tags that are robotically printed on a construction surface. More particularly, the present disclosure is directed to using Quick Response (QR) codes printed by a mobile printing robot during printing of a layout to provide a variety of different services to users based on their role and the phase of a construction project.

BACKGROUND

Construction projects can be extremely large and complex and the digital information associated with a single project may consist of terabytes of information. One of the challenges in construction is in disseminating digital information that is relevant for each member of the construction crew at the current phase of the construction project and the current job and location that each person is working on. Traditionally this has been accomplished by printing the information on stacks of large format paper called the plans or blueprints and placing these at multiple locations in the job site. More recently, digital representations of the plans are brought onto the job sites on digital devices such as tablet computers using Construction Management (CM) software such as Procore, CMIC, or Autodesk Construction Cloud.

In both cases the challenge remains the same. Each person needs to sift through the information to find the data relevant to their role at the location where they're performing their work. In a digital format, finding data is simplified through the use of search features, and being able to input a location and type of information needed. However, this requires the person in the field to make a note of which region or room they are located in, in order to successfully navigate to the correct folder in the CM system that contains the information for the region of interest. Identifying the correct location on a job site is often challenging. Features people normally rely on to understand where they are in a building that has not yet been constructed and knowing what will be there requires the ability to visualize 2D drawings in the real-world 3D space.

SUMMARY

A system and method utilize a mobile robotic printer to print location information tags when a layout is printed. The location information tags can later be used to identify a location of a user on a construction site when the user scans the location information tag with a mobile computing device, such as a smartphone or a tablet device. A variety of services may be provided, including providing role-based construction information.

An implementation of a method of placing location tangs on a construction site includes: receiving a format describing locations and numbers of location information tags to be added to files of a layout, with the format further defining how location information is encoded in the location information tags as information scannable by a mobile computing device; and utilizing a mobile robotic printer to print the layout with the location information tags. In one implementation, the location information tags include QR codes. In one implementation, the QR codes are scannable by mobile computing devices of construction workers to identify a location of interest in the layout and access information relevant for the worker based at least in part on the worker's ID and their role in a construction project. In another example, the method further includes receiving, from a mobile device of a user associated with a construction site, login credentials and a scanned location information tag printed at a location of a layout printed on the construction site; determining an identity and role of the user based on matching the user's login credentials to stored information of users and their roles in the construction site; identifying a location of interest to the user based on the scanned location information tag; retrieving a phase of construction based on the current date and time based on a construction schedule, and accessing targeted information currently relevant to the user from a construction management system based on the identity and role, the location of interest, and the phase of construction.

A second example of a method retrieves information for a construction employee. It includes receiving, from a mobile device of a user associated with a construction site, login credentials and a scanned QR code for a QR code printed at a location of a layout printed on the construction site; determining an identity and role of the user based on matching the user's login credentials to stored information of users and their roles in the construction site; identifying a location of interest to the user based on matching the scanned QR code to a collection of QR codes printed at different locations of the layout; retrieving a phase of construction based on the current date and time based on a construction schedule, and accessing targeted information currently relevant to the user from a construction management system based on the identity and role, the location of interest, and the phase of construction.

In one implementation of the second method the information is relevant to at least one room of the layout and comprises at least one of: construction instructions, a check list, a checkoff list, and a materials list.

In one implementation of the second method, the user role comprises a user trade.

In one implementation of the second method, the relevant information comprises trade-specific information. In one implementation, the trade specific information includes at least one of construction instructions, a check list, a checkoff list, and a materials list.

One implementation of the second method includes receiving from the user a part ID, checking the part ID, and determining if the user is using the correct part.

One implementation of the second method further includes tracking which portions of a construction process have been completed at the location of interest. In one implementation, a digital twin is updated based on the tracking.

One implementation of the second method further includes: utilizing a mobile printing robot to print the layout with QR codes printed in pre-selected format with a number and arrangement of QR codes selected to provide scannable location information for users of mobile computing devices on a construction site.

A third method verifies work on a construction site. In one implementation it includes receiving, from a mobile device of a user associated with a construction site, login credentials and a scanned QR code for a QR code printed at a location of a layout printed on the construction site; retrieving an identity and role of the user based on matching the user's login credentials to stored information of users and their roles in the construction site; retrieving a location of interest to the user based on matching the scanned QR code to a collection of QR codes printed at different locations of the layout; retrieving information about a type of materials being installed at the location of interest based on barcodes or QR codes located on the materials used for the work; and confirming the correct installation of materials based on the construction plans and the materials being installed at that location and time.

One implementation of the third method further includes: utilizing a mobile printing robot to print the layout with QR codes printed in pre-selected format with a number and arrangement of QR codes selected to provide scannable location information for users of mobile computing devices on a construction site.

A fourth method tracks the progress of work on a construction site. In one implementation it includes determining an identity and role based on a user's login credentials; identifying a location of work being performed based on a scanned QR code located at the job site; retrieving information about a type of materials being installed based on scanned barcodes or QR codes located on the materials used for the work; and updating the progress of work by combining the identity and role of the user, the location of the work, and the type of work to track which portions of the construction process have been completed.

One implementation of the fourth method further includes: utilizing a mobile printing robot to print the layout with QR codes printed in pre-selected format with a number and arrangement of QR codes selected to provide scannable location information for users of mobile computing devices on a construction site.

Other implementations of one or more of these aspects include corresponding systems, apparatus, and computer programs, configured to perform the actions of the methods, encoded on computer storage devices. According to one innovative aspect of the subject matter in this disclosure, one or more methods may be implemented on a system comprising a processor and memory storing instructions, that, when executed, cause the system to perform one or more of the methods discussed in this application.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 2 is a block diagram illustrating a system for providing enhanced construction management services in accordance with an implementation.

FIG. 4 is a flow chart of an example alternative method for providing target information in accordance with an implementation.

FIG. 5 is a flow chart of an example method for ensuring a correct installation of materials in accordance with an implementation.

FIG. 6 is a flow chart of an example method for updating a digital twin in accordance with an implementation.

DETAILED DESCRIPTION

The present disclosure describes systems and methods for providing enhanced construction management services using printed location information tags. In one implementation, the printed location information tags are printed when a mobile printing robot prints a layout.

Figure 1A:
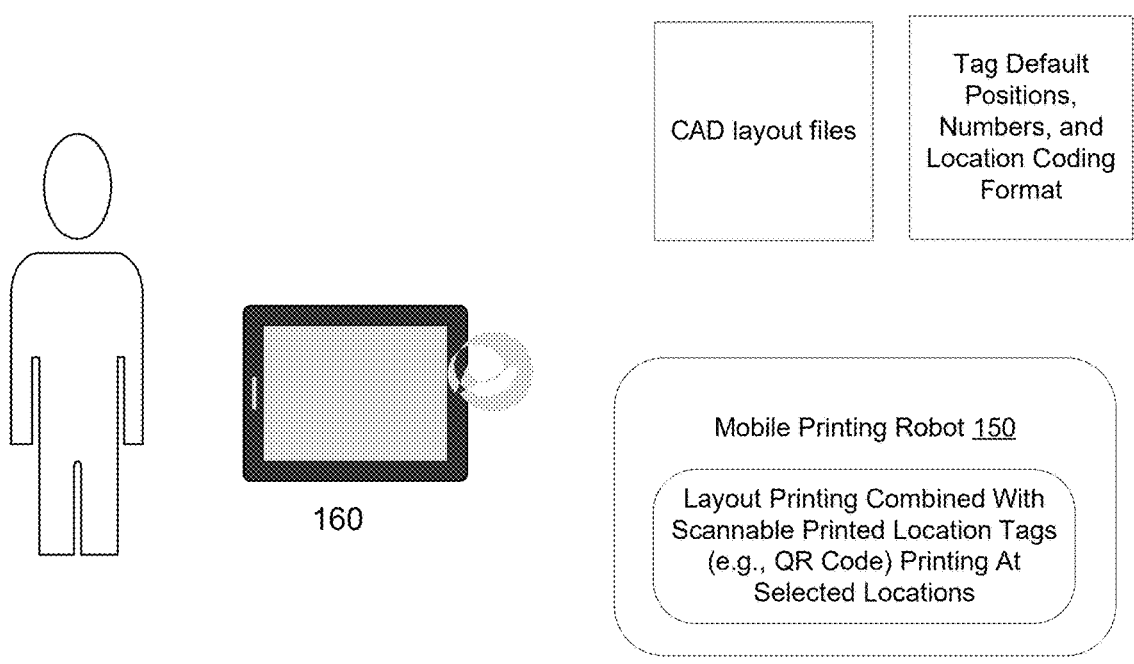
FIG. 1A is a block diagram illustrating using a mobile printing robot to print location information tags, such as QR codes, in accordance with an implementation.

FIG. 1A illustrates at a high level a mobile printing robot 150 and a tablet device operated by an operator. The mobile printing robot 150 prints a layout, which is represented by computer aided design (CAD) layout files for a layout to be printed. There is also a format for printing location information tags. This may include, for example, a format for the number and position of the location information tags relative to features of the layout. The format may also describe the manner in which location information is to be visibly presented in a manner that a portable computing device, such as a smartphone or tablet device, may read, such as a QR code, a numeric (or alphanumeric) string, etc. The format may also have associated with it one or more rules for identifying the location of a location information tag with respect to specific rooms or other features of construction plans. For example, different QR codes could be assigned to different rooms of the layout or even different walls or other features of the layout.

There are a variety of ways the QR code or location tag may be linked to a physical location in the building. In one example a lookup table may be used to link the two. For example, the table may specify that tag number 39472 is located 100 ft north and 32 ft west of the CAD file's origin. In another example, a location tag may have a number that's linked to a physical feature in the building, for example, the entryway of door 203. This method has the disadvantage that if the feature is moved or changed, the QR code may also need to be moved accordingly. Finally, the location of the tag may be embedded directly in the code. For example, the location 100 ft north and 32 ft west may be encoded in the QR code, or other tag that is used.

Figure 1B:
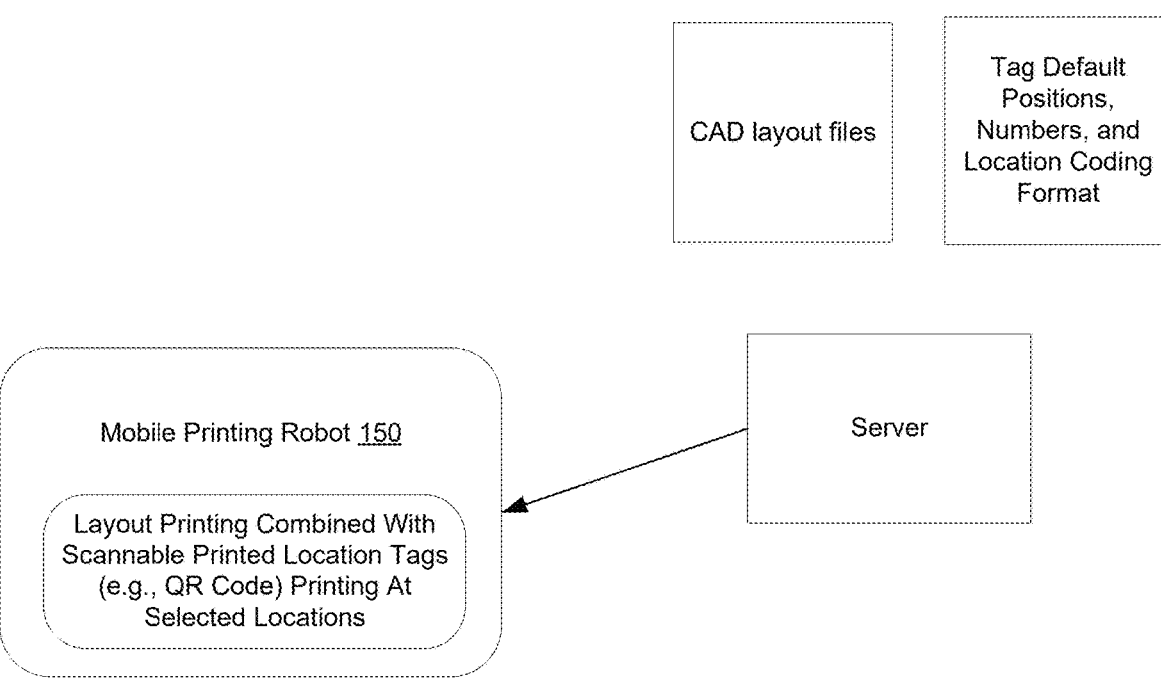
FIG. 1B is a block diagram illustrating using a mobile printing robot to print location information tags, such as QR codes, in accordance with an implementation.

Adding location information tags to a layout may be implemented in various ways, including providing user interfaces for an operator to customize the locations and numbers of location information tags for a particular construction job. In FIG. 1A, a user using a tablet device 160 enters edits to the layout to enter the location information tags. However, in FIG. 1B, as an alternative, a server or cloud-based system could be used to support adding location information tags to the CAD files of a layout to be printed. In any case, a variety of techniques may be used to edit the files of a layout to add location information tags in a manner consistent with generating robot-ready layout files in which a layout is printed along with the location information tags.

Printing location information tags during robotic printing of a layout allows the location information tags to be printed at a low cost.

Figure 1C:
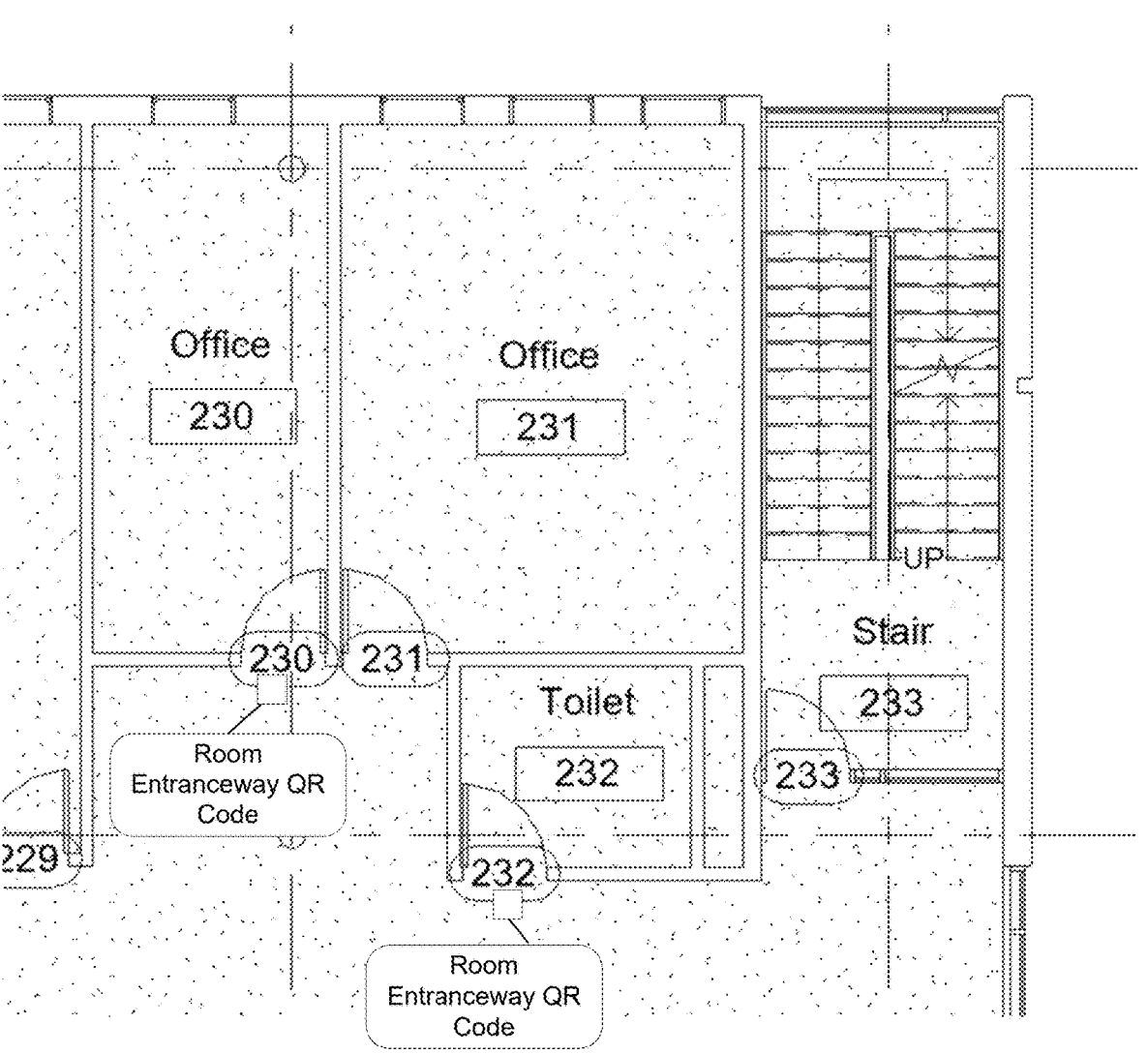
FIG. 1C illustrates how a layout may be printed to include location information tags, such as QR codes, with a layout in accordance with an implementation.

FIG. 1C illustrates at a high level that location information tags can be printed by a mobile printing robot at different locations of a layout, including at room entranceways. For example, a QR code could be printed in a room entranceway, either by itself or with other printed information.

FIG. 2 illustrates components of a system 202 to provide enhanced construction management services. In one implementation, it leverages a construction management system 230. The construction management system 230 may, for example, include construction management software running on a server or the cloud that includes detailed construction information files 234, a master construction schedule 232, analytics 238 to generate reports, and that may also include a digital twin 236 in terms of a virtual replica of the current status of the construction project. The construction management system 230 may also alternatively be implemented as software running on mobile computing devices at a construction site.

Enhanced construction management services of system 202 are provided to the portable user devices of users. It will be understood that system 202 may be implemented as a server or cloud-assisted service to augment the capabilities of a construction management system 230. Also, depending on implementation details, some or all of the components of system 202 may be implemented as a software program executed on the processors of the mobile devices of users and that utilizes an API, communication protocol, or other technique known by those in the art to communicate with the construction management system 220. As still yet another option, system 202 may be integrated into a construction management system. The various components of the system 202 may be implemented as computer instructions executable by processors with support from memory and data storage.

In one implementation, a mobile printing robot 150 at some initial time prints a construction layout and also prints location information tags at selected locations that contain location information. In one implementation, the tags are QR codes, although more generally other types of printable optical codes could be used, including other types of printable codes, numeric strings, text strings, or alphanumeric strings. After the layout with the location information tags is printed, a user with mobile device may then use their mobile device, such as a smartphone or tablet device, to scan or otherwise read a tag. Each of the printed tags may, for example, be printed at pre-selected location with respect to a layout. For example, suppose there are a number N, of different rooms in a layout. If there is one tag per room, there would be N different tags, each identifying a different room. For example, each of the N tags could have a different QR code corresponding to a different location of the layout, which in this example would be different rooms of the layout.

In one implementation, information is stored to identify, for each user, user credentials, a user ID, and a user role 204. For example, a user may enter a user-name and a user password as user credentials. However, more generally, the user credentials could include other types of information, such as an employee number, information from an employee security badge, biometric information such as a user photo, etc. The user ID for and the role of the user can then be looked up using a simple mapping/matching function 212. For example, for a multi-trade layout a role may be a particular trade (e.g., electrician, a carpenter, a plumber). Another example of role is a contractor role, such as a general contractor or a particular type of contractor (e.g., an electrical contractor). For example, for a particular construction project, this information can be populated and updated as necessary if, for example, individual users are added or deleted from those working on the construction site.

In one implementation, scans of printed location tags 210 from individual mobile devices are recorded along with a user ID and a timestamp. For example, during a log in procedure, the login credentials may be associated with an individual user device that scans or otherwise records the information of a particular printed location tag. A location mapping unit 216 determines the user's location, with the particular mapping logic varying slightly depending on how the location information tags represent location information. From the master construction schedule 232, the current phase of construction 208 for the location is determined. In one implementation, information relevant to the user 206 can be provided specific to the location and the current phase of construction is provided. As a few illustrative examples, this may include, for a particular user role, materials lists, instructions, check list, and check off completion lists. Thus, for example, a user whose user role is that of an electrician may, for a particular room location at a particular time, receive relevant information specific to their role that might be different than, say, relevant information for a plumber at a different location of the construction site, at a different time. In some implementations, this may include part lists to aid a user to use the correct parts or correct materials.

In one implementation, a communication/control unit 220 may be provided to support communication with the construction management system 230 and with individual mobile devices. This may also include, for example, any necessary APIs to support communication with different types of wireless communication protocols for different types of smartphones and tablet devices used by users on a construction site.

In one implementation, tracking of completion of a portion of construction 209 is supported. For example, this may take into account a user checking off that they have completed work assigned to them.

FIG. 2 illustrates an example of a system for seamlessly linking locations in physical space with resources in the digital world, based on the time at which the information is requested and the role and identity of the requester. This provides the user with an effort-free and error-free experience in pulling the correct information.

The mobile printing robot in one implementation is a Dusty Robotics FieldPrinter™ developed by Dusty Robotics, Inc. The FieldPrinter™ is an example of a mobile printing robot for printing a layout on a construction surface. It will be understood that the techniques described in this application may be practiced with other types of mobile printing robots. The Dusty Robotics FieldPrinter™ allows accurate location-based tags to be printed in many locations throughout the construction site at a very low cost.

In one implementation, these printed location-based tags allow a user to scan these tags using, for example, a portable device such as a smartphone or tablet device. In one implementation, the system combines the location information of the printed location-based tag that is scanned with information about the person's role and the current phase of construction to instantly bring up the correct information required by each user.

In one example, the Dusty FieldPrinter™ is used to complete a multi-trade layout on a construction project. During layout, a number of QR codes are automatically added to the CAD features at known locations on each floor. For example, the QR codes may be added at pre-selected locations according to a location convention easy for end users to find, such as once per room in an entryway. The number of codes and code locations can be adjusted as would be appropriate for the type of project data and the roles of the users.

In one example, mobile printing robot automatically generates one QR code per room, positioned at the entryway to the room near the doorway and adds it to the layout file. However, once present in the layout file, a mobile printing robot, such as a FieldPrinter™ will print these codes at precisely the correct location as the layout for the floor is being completed. The location convention may be standardized as a default.

As an illustrative example, consider the example where sometime later, after the FieldPrinter has completed printing a layout and has left the job, a construction worker enters the jobsite with a tablet computer. In one implementation, prior to starting the day, the worker logs into the system with their login credentials. The login credentials, may for example, include a name and password but more generally could include other types of information like information from an employee's badge, biometric identification, etc. To access the data they need for their work, the operator then scans the QR code located in a room (e.g., patient room 403 in a hospital layout) that the Dusty FieldPrinter had generated earlier. The system then starts the task of pulling relevant information from the construction management database. In this example, the system knows 1) the role and identity of the person scanning the code (e.g. the mechanical contractor's foreman), 2) the location of the QR code (e.g. room 403), 3) the current date and time, and 4) the phase of construction according to the master construction schedule. Using these pieces of information, the system is able to access the construction management system and pull out the relevant mechanical sections of the drawings that show room 403 and are relevant to the current stage of construction. That is, in this example, a mechanical contractor foreman receives information relevant to their role at a particular location at a particular time in a particular phase of the construction schedule.

In another example, when a general contractor's Project Manager scans the QR code in the same room, room 403, he will be shown the items from the construction management system that are relevant to the general contractor. He could default to seeing a 3D model, such as a Revit model of the job site zoomed in to Room 403, which saves him time otherwise spent navigating through the entire 3D model and orienting himself to the particular location where he is standing.

In a third example, an electrical contractor foreman could scan the same QR code and be shown a list of the electrical fixtures that are to be installed in that room. At a later date, that same electrical foreman could scan the same QR code and be shown a punch list of all the repairs that need to be made to the equipment in that same room.

As previously discussed, the location information tag may be implemented in different ways and represent location information using different schemes. A QR code allows text information to be embedded in the code. This information could be a representation of the location itself, for example, the code could contain an x and y coordinate with respect to the origin of the plans and a floor number. Other examples of codes include bar codes, fiducial markings, or even text with a fixed format that is readable with an app through the camera. Note that the wear caused by construction traffic may make certain code types favorable over others.

In an alternate implementation, a code used by a location information tag might contain an index number and the system will refer to a database to identify a location associated with that index. Alternatively, the code could contain encrypted information that allows the retrieval of the location with a key. These latter two implementations have the benefit that the location information is only accessible through the use of a key or lookup table which can be used to restrict access.

In one implementation, the identity and role of the user is obtained through an account that the user sets up in advance. Within the account the role and the user's responsibilities on the job site may be stored, such that when the user logs in with that account with their mobile computing device, all the information is available. However, the system could also obtain this information through other means, such as entering their name, or scanning a badge or other ID card the user already has.

In addition to providing information, the system can be used to gather information on how the state of the job site is changing on an ongoing basis. In a simplistic example, every time the users in the examples above access data on the construction site, the system knows their location and can infer the type of work they are doing. This type of information is extremely valuable in understanding the current state of the construction project and is the type of information that can be used to update a digital twin.

The concept of a digital twin embodies the idea that a virtual model of the construction site's work-in-progress is maintained alongside the physical job site and kept in sync with the physical world as work progresses. This digital twin provides valuable information to the project team about how much of the work has been completed and enables querying of insights such as which areas may be behind schedule, or which areas may be overcrowded based on work schedules and completion rates.

Conventionally, this digital twin was manually updated based on Project Engineers physically walking the job site and observing work in progress, in order to update the state of the digital twin in software. This manual workflow is labor intensive and often prevents a digital twin from being used on a project, despite all the information benefits.

In one implementation, the workflow described above using a QR code allows the digital twin to be automatically updated based on scanning of QR codes in the field. In addition to simply tracking which data is being accessed by the construction workforce and inferring what is happening, providing extra codes on materials allows work to be tracked in detail. This requires identification markers to be affixed to each part that is to be installed in the field (e.g., a UPC code, barcode, or QR codes can be used for this purpose).

In one implementation, a workflow is as follows. When a part is to be installed in the field by a tradesman, they use their mobile phone (or other mobile device) to scan the barcode on the part. They also use their phone to scan the printed QR code located near where the part is to be installed. The printed QR code links to information useful for part installation per the above workflow, such as installation instructions for the specific part. It can also confirm that this part is the correct part to be installed at this location, and then raises an error if this part is not specified for installation there.

In one implementation, based on the information captured from the job site, the digital twin can be automatically updated to note that this tradesman has begun installation of this part at this location. In some implementations, other information that is captured is used to update the digital twin.

In one approach, scanning a QR code brings up a checklist of items in a user interface presented on the mobile computing device of a worker that need to be completed on the job site. As a worker finishes each job they simply scan in the QR code at their work location and check off all the items that have been completed. In one example, a QR code is printed in front of each wall at the jobsite. As a member of the construction crew works on each wall in the area, they scan the QR code in front of the wall. By accessing the data in a construction management tool, information on the type of work to be performed is presented. For example, the type of drywall to be installed, or the location, height, and type of outlets to be installed. In one implementation, a checklist, available through the same interface can also be used to check off items as they are completed. The data from this checklist is then sent back to the construction management system to track the progress of the installation at that location on the jobsite.

In one implementation, based on information collected over time in the digital twin, the information can be used for future value engineering. For example, an architect could consult actual installation rates (e.g. 6 doors per hour for manufacturer A, vs 10 doors per hour for manufacturer B) in order to determine which door manufacturer to select for future jobs based on installation cost.

Figure 3:
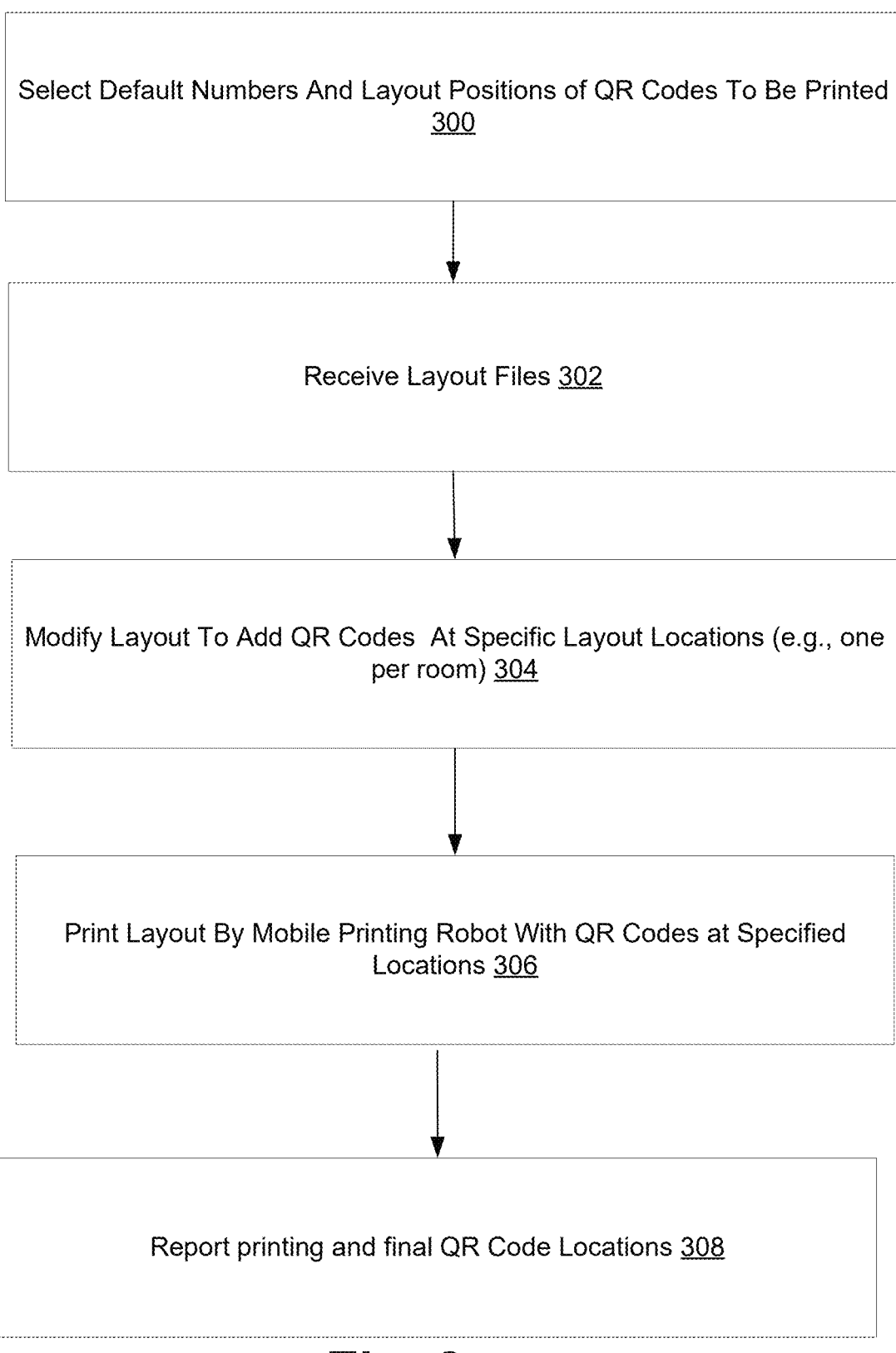
FIG. 3 is a flow chart of an example general method for printing a layout with additional location information tags in accordance with an implementation.

FIG. 3 is an example of a flowchart of a method of printing a layout with the printed location tags, which in this example are QR codes. In block 300, default numbers and positions of the QR codes are selected. For example, the default rules could be one tag per room although other possibilities include one tag per room wall. More generally, other default rules could be selected for the numbers and positions where QR codes are to be placed relative to common layout features.

In block 302, layout files (e.g., CAD files) are received. In block 304, the layout files are modified to add QR codes at specific layout locations. This may be done automatically. Alternatively, an operator may input commands (e.g., using a tablet computing device) to confirm the placement of the QR codes and make any necessary adjustments in view of obstacles at the construction site. In block 306 the layout is printed by the mobile printing robot with the QR codes at specified locations (e.g., one per room, one per wall, etc.). In block 308, an optional step may be performed to report the completion of the printing and provide an update on the final QR code locations. For example, while there may be a default rule to print QR codes at specific locations, such as room entryways, in practice there could in theory be an obstacle on the construction site requiring a modification of the default rule.

In one implementation, the method of FIG. 3 is performed in the field at the construction site with the help of a human operator using, for example, a tablet device with a user interface to enter default settings and make any necessary adjustments should there be obstacles on the construction site. Alternatively, some of the steps could be performed using a server or cloud-based tool to modify the CAD layout files used by the mobile printing robot.

FIG. 4 is an example of a flowchart of a method of providing targeted information to a user. In block 402, the identity is determined based on the user's login credentials, in which, for example, a user may log in from their mobile device such as a smartphone or tablet device. The user's login credentials may, for example, include a username and password that is matched to stored information on user IDs and roles. The user would then scan in a QR code at a location in the construction site, such as QR code in a room. In block 404, the location of interest to the user is identified from the scanned QR code, which as previously discussed may employ a variety of techniques to encode information to represent a location. In block 406, the phase of the construction is retrieved based on construction schedule and the date and time. In block 408, targeted information is accessed that is relevant to the user based on their identity, role, location of interest, and the current phase of construction.

FIG. 5 is an example of a flowchart of a method of confirming the correct installation of materials in accordance with an implementation. In block 502, a determination is made of the identity and role of a user based on the user's login credentials. In block 504, the location of the user, and the work to be performed, is based on the scanned QR code located at the job site. In this example, the materials to be installed have barcode, QR code, or type of code that the user can scan. The information about the materials is then retrieved in block 506. In block 508, a confirmation is made that the correct materials are being installed based on the construction plans for the materials being installed at that location and time.

FIG. 6 is an example of a flowchart of method of tracking the status of a construction process. In block 602, a determination is made of the user's identity and their role based on the user's credentials. In block 604, the user's location is identified from a scan they perform of the QR code located at the job site. The portions of the construction process completed 610 may be tracked in a variety of ways, such as through check-off lists 606, verifying materials used 608, etc. In block 612, a digital twin model of the construction project is updated based on the tracked progress.

Figure 7:
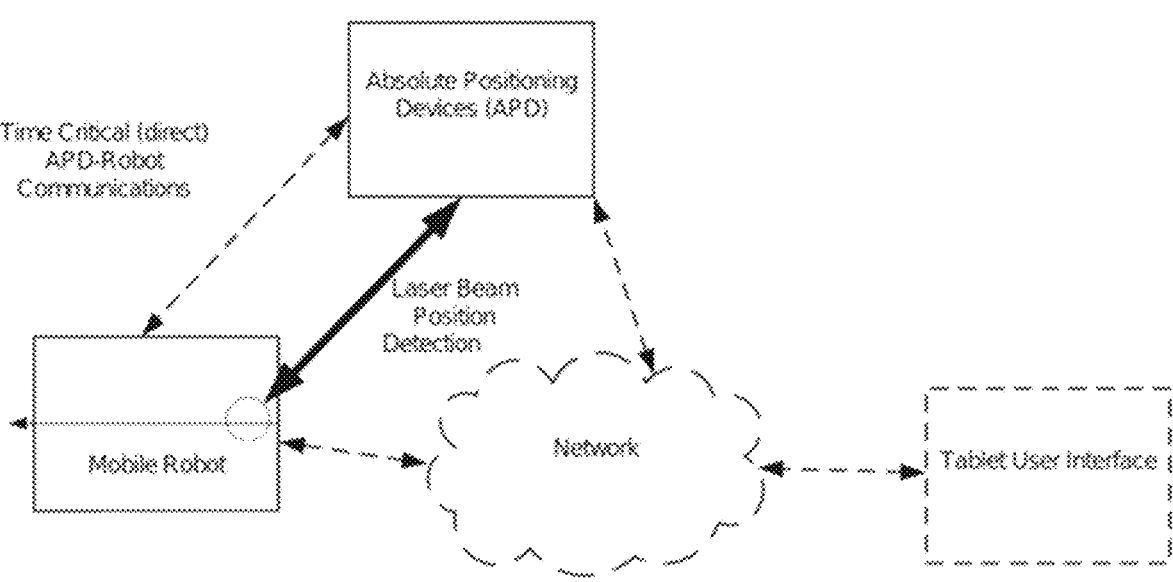
FIG. 7 illustrates an example of a mobile robotic printer.
Figure 8:
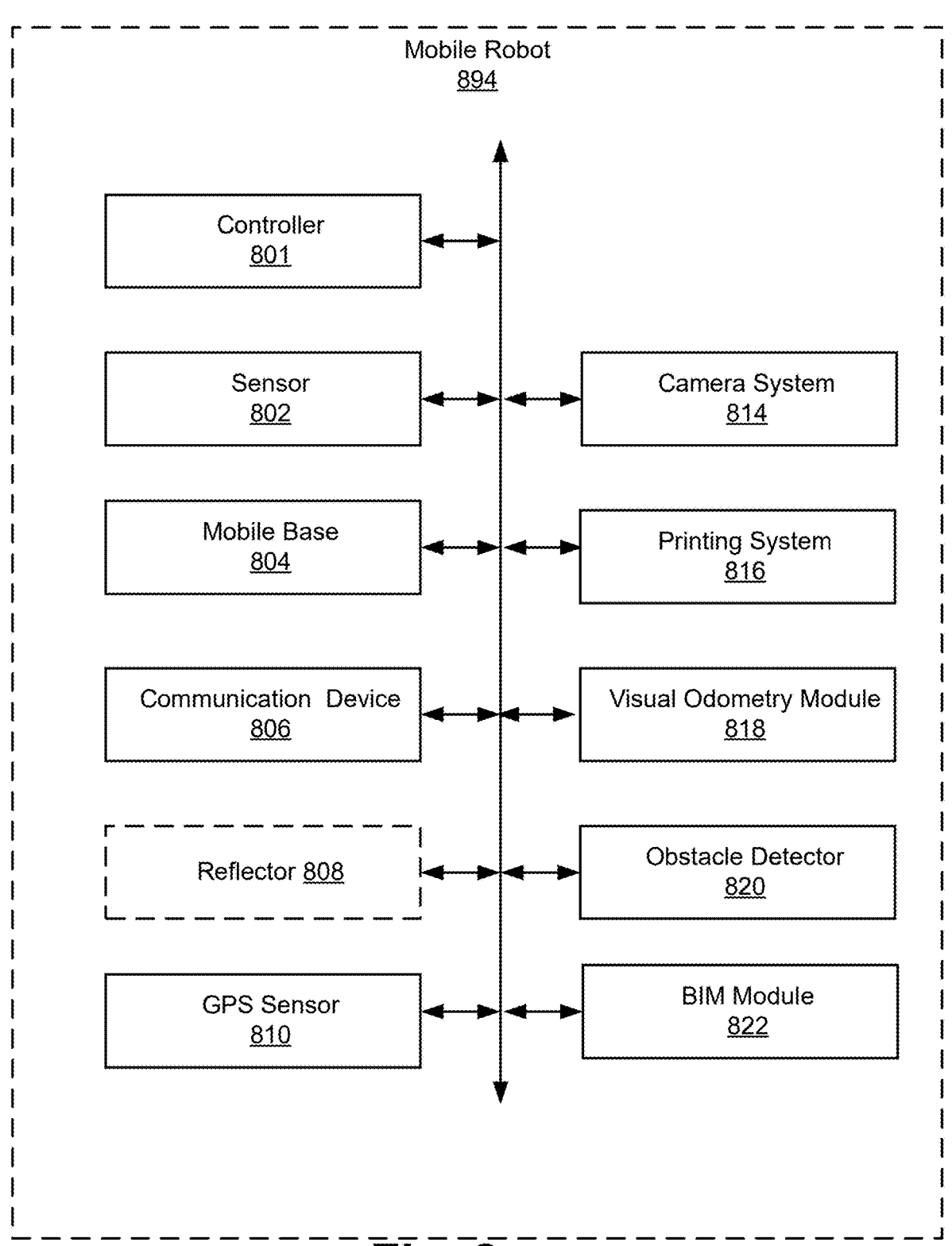
FIG. 8 illustrates an example of components of the mobile robotic printer of FIG. 7.

FIG. 7 and FIG. 8 illustrate an example of a mobile printing robot, which is described in more detail in the following patent applications and issued patents of the assignee of the present application are hereby incorporated by reference, "Mobile Printing Robot & Related Methods", filed Nov. 21, 2019, U.S. application Ser. No. 16/691,413; "Mobile Printing Robot and Printing Methods with Line Printing Pathway Optimization", filed Apr. 23, 2020; U.S. application Ser. No. 16/856,888; "Mobile Printing Robot System, Apparatus, and Method to Automatically Print Construction Trade Information for Printed Layout Lines", filed Sep. 23, 2021, U.S. application Ser. No. 17/483,550; "Method of Operating a Printing Robot in Shadows", filed Feb. 24, 2022, U.S. application Ser. No. 17/680,280; "Mobile Robot Printing with Wind Protection", filed Apr. 18, 2022, U.S. application Ser. No. 17/722,830; "Position Accuracy Robotic Printing System", issued Feb. 14, 2023 as U.S. Pat. No. 11,577,397; and "Mobile Robot Printing with Wind Protection", issued May 24, 2022 as U.S. Pat. No. 11,338,576.

FIG. 7 is a high-level block view of a mobile robotic printing system. A mobile printing robot system includes a mobile printing robot having mounted to it a retroreflector, an Absolute Positioning Device (APD) such as a laser tracker or total station, a tablet device, and wireless communication. The APD provides absolute position information to the mobile printing robot, aiding in providing precise position control.

FIG. 8 illustrates an example of major functional blocks of the mobile robot 894 in accordance with an implementation. The mobile robot has a mobile base 804 with a drive system. While omnidirectional drive is possible, the mobile robot may have a preferred longitudinal forward direction for printing purposes. In one implementation, the mobile robot comprises a controller 801; one or more sensors 802, one of which may be an IMU, accelerometer, gyroscope, or compass; a mobile base 804 including features, such as motors and wheels to move the mobile robot; a communication device 806; a reflector 808 (e.g., which may support different implementations of a retroreflective function using, for example, corner turning mirrors, prisms, or other retroreflective devices, as discussed in the patent applications incorporated by reference), a printing system 816, a visual odometry module 818, an obstacle detector 820, a BIM module 822, a battery and a cliff detector. In some implementations, a GPS sensor 810 may be included, and a camera system 814. More generally, the mobile robot printer may include a variety of sensors and detectors, which may be different from that shown depending on implementation details. In one embodiment, the communication device 806 implements a wireless communication link with the APD and/or the optional portable device.

In one implementation, the APD measures the robot's location by using a laser beam, to detect the location of a retroreflector 808 which may be implemented in various ways such as in corner reflector, prism, or other retroreflective device, which can be affixed to the robot. For example, the reflector, prism, or similar retroreflective device can be permanently attached to the robot, detachably attached to the robot, or otherwise temporarily fixed. For example, a mounting structure may permit the reflector, prism, or other similar retroreflective device to be mounted/demounted on the mobile robot.

In one embodiment, the measured location, determined by the APD, is communicated to the robot via a wireless link. This link may use an existing network such as WiFi, or alternatively it may happen through a direct communication channel using a radio or optical connection between the APD and the robot. One advantage of a direct communication channel over WiFi is that it minimizes the potential for network delays that can occur in locations in which there is a lot of WiFi network traffic.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method of placing location tags on a construction site, comprising:

receiving files for a layout;

generating location information tags to be added to the layout, with a format defining positions of a plurality of location information tags with respect to specific positions of features of the layout, the format further defining how location information is encoded in the plurality of location information tags as information scannable by a mobile computing device; and utilizing a mobile robotic printer to print the layout on a construction surface with the plurality of location information tags printed on the construction surface at positions defined by the format with respect to the layout.

2. The method of claim 1, wherein the plurality of location information tags comprise Quick Response (OR) codes.

3. The method of claim 2 wherein the QR codes are scannable by mobile computing devices of construction workers to identify a location of interest in the layout and access information relevant for a construction worker based at least in part on a worker's identification (ID) and their role in a construction project.

4. The method of claim 1, further comprising:

receiving, from a mobile device of a user associated with a construction site, log-in credentials and a scanned location information tag printed at a location of a layout printed on the construction site;

determining an identity and role of the user based on matching the login credentials to stored information of users and their roles in the construction site;

identifying a location of interest to the user based on the scanned location information tag;

retrieving a phase of construction based on a current date and time based on a construction schedule; and accessing targeted information currently relevant to the user from a construction management system based on the identity and role of the user, the location of interest to the user, and the phase of construction.

5. The method of claim 4, wherein the plurality of location information tags comprise Quick Response (QR) codes.

6. The method of claim 1, wherein the feature is selected from the group consisting of a room, a wall, and an entranceway.

7. A method of retrieving information for a construction employee, comprising;

utilizing a mobile printing robot to print a layout with Quick Response (OR) codes printed in a pre-selected format with a number and arrangement of QR codes printed with respect to features of the layout selected to provide scannable location information for users of mobile computing devices on a construction site;

receiving, from a mobile device of a user associated with a construction site, log-in credentials and contents of a scanned QR code from a QR code printed at a pre-selected location with respect to a position of a feature of the layout printed on a constructive surface of the construction site by the mobile printing robot;

determining an identity and role of the user based on matching the login credentials to stored information of users and their roles in the construction site;

identifying a location of interest to the user based on information from the scanned QR code and the pre-selected location of the QR code with respect to the feature of the layout;

retrieving a phase of construction based on a current date and time based on a construction schedule; and accessing targeted information currently relevant to the user from a construction management system based on the identity and role of the user, the location of interest of the user, and the phase of construction.

8. The method of claim 7, wherein the targeted information is relevant to at least one room of the layout and comprises at least one of: construction instructions, a check list, a checkoff list, a materials list, building plans, drawings, or a 3D view of a finished project.

9. The method of claim 7, where the user's role comprises a user's trade.

10. The method of claim 7, wherein the targeted information comprises trade-specific information.

11. The method of claim 10, where the trade specific information comprises at least one of construction instructions, a check list, a checkoff list, and a materials list, building plans, drawings, or a 3D view of a finished project.

12. The method of claim 7, further comprising: receiving from the user a part ID, checking the part ID, and determining if the user is using a correct part.

13. The method of claim 7, further comprising tracking which portions of a construction process have been completed at the location of interest.

14. The method of claim 13, further comprising updating a digital twin based on the tracking.

15. The method of claim 7, wherein the feature is selected from the group consisting of a room, a wall, and an entranceway.

16. A method of verifying work on a construction site comprising;

receiving, from a mobile device of a user associated with the construction site, login credentials, and a scanned Quick Response (QR) code for a QR code printed at a pre-selected location with respect to a feature of a layout printed on a construction surface of the construction site;

retrieving an identity and role of the user based on matching the login credentials to stored information of users and their roles in the construction site;

retrieving a location of interest to the user based on matching the scanned QR code to a collection of QR codes printed at different locations of the layout;

retrieving information about a type of material being installed at the location of interest based on barcodes or QR codes located on materials used; and confirming correct installation of materials based on construction plans and the materials being installed at the location of interest.

17. The method of claim 16, further comprising: utilizing a mobile printing robot to print the layout with additional QR codes printed in pre-selected format with a number and arrangement of QR codes selected to provide scannable location information for users of mobile computing devices on the construction site.

18. The method of claim 16, wherein the feature is selected from the group consisting of a room, a wall, and an entranceway.

19. A method of tracking progress of work on a construction site comprising;

determining an identity and role based on a user's login credentials;

identifying a location of work being performed based on a scanned Quick Response (QR) code printed with a layout on a construction surface at the construction site by a mobile printer robot, the QR code printed at a pre-selected position with respect to a feature of the layout;

retrieving information about a type of material being installed based on scanned barcodes or QR codes located on materials used for the work;

combining the identity and role of the user, the location of the work, and a type of work to track which portions of a construction project have been completed.

20. The method of claim 19, further comprising:

utilizing a mobile printing robot to print a layout with QR codes printed in a pre-selected format with a number and arrangement of QR codes selected to provide scannable location information for users of mobile computing devices on a construction site.

21. The method of claim 19, wherein the feature is selected from the group consisting of a room, a wall, and an entranceway.

\* \* \* \* \*